(12) United States Patent
Kuno et al.

(10) Patent No.: US 6,216,808 B1
(45) Date of Patent: *Apr. 17, 2001

(54) BRAKE CONTROL SYSTEM FOR AN ELECTRICALLY OPERATED VEHICLE

(75) Inventors: Tetsuya Kuno; Tadashi Terazawa; Shingo Urababa; Harumi Ohori; Kenji Asano, all of Toyota (JP)

(73) Assignee: Aisin Seiki Kabushiki Kaisha, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,083

(22) Filed: Jul. 29, 1998

(30) Foreign Application Priority Data

Jul. 30, 1997 (JP) .................................................. 9-220124
Sep. 17, 1997 (JP) .................................................. 9-270530

(51) Int. Cl.[7] .............................. B60K 6/00; B60K 31/00; B60T 8/64
(52) U.S. Cl. ...................... 180/65.3; 180/2.1; 180/165; 180/170; 701/78; 303/152
(58) Field of Search ............................. 180/65.3, 65.1, 180/170, 165, 2.1; 701/78; 303/152, 112

(56) References Cited

U.S. PATENT DOCUMENTS

| | | | | |
|---|---|---|---|---|
| 3,972,380 | * | 8/1976 | Hudson et al. ................... | 180/65.3 |
| 4,181,366 | * | 1/1980 | Dobner ............................ | 180/65.1 |
| 5,318,355 | * | 6/1994 | Asanuma et al. ................ | 180/65.1 |
| 5,399,000 | * | 3/1995 | Aoki et al. ...................... | 180/65.1 |
| 5,433,512 | * | 7/1995 | Aoki et al. ...................... | 180/65.1 |
| 5,714,856 | * | 2/1998 | Young ............................. | 180/65.1 |
| 5,839,533 | * | 11/1998 | Mikami et al. ................. | 180/65.3 |
| 5,839,800 | * | 11/2000 | Koga et al. ..................... | 303/152 |
| 5,941,328 | * | 8/1999 | Lyons et al. .................... | 180/65.3 |
| 6,021,365 | * | 2/2000 | Ishii et al. ...................... | 180/65.1 |
| 6,142,586 | * | 11/2000 | Sakai ............................. | 303/152 |

FOREIGN PATENT DOCUMENTS

| | | |
|---|---|---|
| 43 27 206 | 2/1995 | (DE) . |
| 44 35 953 | 5/1995 | (DE) . |
| 2 282 651 | 4/1995 | (GB) . |
| 5-161210 | 6/1993 | (JP) . |
| 7-336806 | 12/1996 | (JP) . |
| 95/05299 | 2/1995 | (WO) . |

* cited by examiner

Primary Examiner—Brian L. Johnson
Assistant Examiner—Matthew Luby
(74) Attorney, Agent, or Firm—Burns, Doane, Swecker & Mathis, LLP (57) ABSTRACT

The present invention is directed to a brake control system for an electrically operated vehicle which is adapted to reduce a regenerative braking torque and add a hydraulic braking force to compensate for lack of the regenerative braking torque, when voltage of a battery exceeds an upper limit. A motor control unit is provided for controlling an electric motor to apply a rotating force to a wheel and apply the regenerative braking torque to the wheel. A pressure control device is provided for supplying pressurized brake fluid to a wheel brake cylinder in response to operation of a manually operated braking member to apply the hydraulic braking force to the wheel. A reducing device is provided for reducing the regenerative braking torque when the voltage of the battery exceeds a predetermined upper limit. And, a compensation device is provided for actuating the pressure control device to supply the pressurized brake fluid to the wheel brake cylinder when the regenerative braking torque reduced by the reducing device exceeds a predetermined level, e.g., when a rate for reducing the regenerative braking torque exceeds a predetermined rate, or when a reduced amount of the regenerative braking torque exceeds a predetermined amount.

7 Claims, 9 Drawing Sheets

BRAKE CONTROL SYSTEM FOR AN ELECTRICALLY OPERATED VEHICLE

This application claims priority under 35 U.S.C. 119 to No. 9-220124 filed in Japan on Jul. 30, 1997 and No. 9-270530 filed in Japan on Sep. 17, 1997, the entire contents of which are herein incorporated by reference.

BACKGROUND OF THE INVENTION

1. Field of the Invention

The present invention relates to a brake control system for an electrically operated vehicle to perform a regenerative braking operation and a hydraulic braking operation, and more particularly to the brake control system which is adapted to reduce a regenerative braking torque and add a hydraulic braking force to compensate for lack of the regenerative braking torque, when voltage of a battery exceeds a predetermined upper limit, thereby to protect the battery.

2. Description of the Related Arts

In an electrically operated vehicle provided with an electric motor as a power source, the electric motor also functions as a generator for performing the regenerative braking operation to recover energy by charging a battery and use the energy for driving the motor. Since the braking force applied to the vehicle wheels through the regenerative braking operation is limited, it must be compensated by a hydraulic braking operation. Therefore, both of the regenerative braking operation and the hydraulic braking operation are performed, as disclosed in Japanese Patent Laid-open Publication No.5-161210. According to the prior brake control system for the electrically operated vehicle as disclosed in the Publication No.5-161210, when the voltage of the battery increases to exceed a predetermined threshold level, the regenerative braking torque is reduced so as to protect the battery, whereby the braking force through the regenerative braking operation is reduced. However, when the control for reducing the regenerative braking torque is initiated, if the regenerative braking torque is reduced rapidly, the compensation through the hydraulic braking operation will be delayed, so that deceleration of the vehicle may be reduced temporarily. As a result, feelings to a vehicle driver in his braking operation will be varied.

Also, according to the prior brake control system as disclosed in the Japanese Patent Laid-open Publication No. 5-161210, the regenerative braking torque is reduced temporarily, so that if the voltage of the battery decreases to enable the regenerative braking operation, it will be restarted. In this case, there remains the braking force such as the hydraulic braking force which compensated for the lack of the braking force when the regenerative braking torque was reduced. Therefore, the deceleration of the vehicle will be increased by the restarted regenerative braking operation. In other words, additional braking force will be applied against the vehicle driver's intention. As a result, feelings to the vehicle driver in his braking operation will be deteriorated.

SUMMARY OF THE INVENTION

Accordingly, it is an object of the present invention to provide a brake control system for an electrically operated vehicle which is adapted to provide a rapid compensation by a hydraulic braking control when a control for reducing a regenerative braking torque is initiated, to ensure a proper brake feeling.

And, it is another object of the present invention to provide a brake control system for an electrically operated vehicle which is adapted to provide a smooth braking operation until the vehicle stops, even if voltage of a battery exceeds a predetermined upper limit, to ensure a proper brake feeling.

In accomplishing the above and other objects, a brake control system is provided for controlling a braking force applied to a wheel of an electrically operated vehicle. The brake control system includes an electric motor which is operatively connected to a wheel for rotating the wheel. A battery is mounted on the vehicle and electrically connected to the electric motor for driving the electric motor. A motor control unit is provided for controlling the electric motor to apply a rotating force to the wheel and apply a regenerative braking torque to the wheel. A wheel brake cylinder is operatively mounted on the wheel for applying a hydraulic braking force to the wheel. A pressure control device is provided for supplying pressurized brake fluid to the wheel brake cylinder in response to operation of a manually operated braking member to apply a hydraulic braking force to the wheel, and controlling the pressure in the wheel brake cylinder. A voltage detector is provided for detecting voltage of the battery. A reducing device is provided for reducing the regenerative braking torque when the voltage of the battery detected by the detector exceeds a predetermined upper limit. And, a compensation device is provided for actuating the pressure control device to supply the pressurized brake fluid to the wheel brake cylinder when the regenerative braking torque reduced by the reducing device exceeds a predetermined level.

In the brake control system as described above, the compensation device may be adapted to actuate the pressure control device to supply the pressurized brake fluid to the wheel brake cylinder, when a rate for reducing the regenerative braking torque by the reducing device exceeds a predetermined rate. Or, the compensation device may be adapted to actuate the pressure control device to supply the pressurized brake fluid to the wheel brake cylinder, when an amount of the regenerative braking torque reduced by the reducing device exceeds a predetermined amount.

The brake control system may further comprise a holding device for holding the reducing device in a condition for reducing the regenerative braking torque, when the amount reduced by the reducing device in a predetermined period is in transition from an increase to a decrease, and the pressure control device may continue to apply the hydraulic braking force to the wheel after the transition of the increase to the decrease of the reduced amount, until the vehicle stops.

Preferably, the pressure control device comprises a static pressure generator for pressurizing the brake fluid stored in a reservoir in response to operation of the manually operated braking member to generate a static hydraulic pressure, an auxiliary power source for pressurizing the brake fluid stored in the reservoir irrespective of operation of the manually operated braking member to generate a power pressure, and a dynamic pressure generator for regulating the power pressure in response to operation of the manually operated braking member to generate a dynamic hydraulic pressure.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
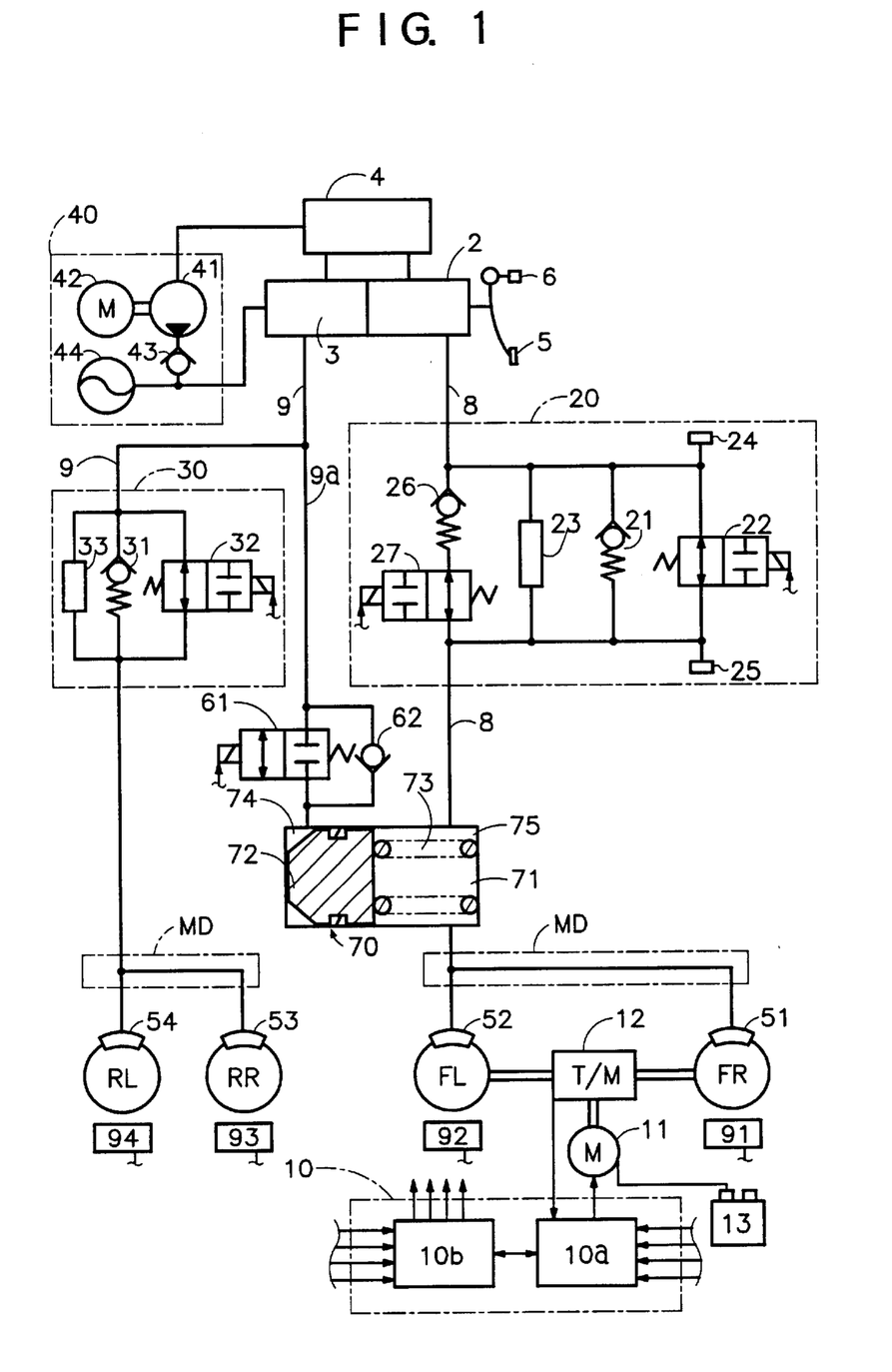
FIG. 1 is a block diagram illustrating a brake control system for an electrically operated vehicle according to an embodiment of the present invention.

Referring to FIG. 1, there is schematically illustrated a brake control system for an electrically operated vehicle according to an embodiment of the present invention, which includes a brake control system having an electric motor 11 for performing the regenerative braking operation and a hydraulic pressure control apparatus for performing a hydraulic braking operation. The hydraulic pressure control apparatus has a master cylinder 2 which serves as a static pressure generator, and a regulator 3 which serves as a dynamic pressure generator, both of which are operated in response to depression of a brake pedal 5. Referring to FIG. 1, wheel brake cylinders 51, 52, 53, 54 are operatively mounted on wheels (FR), (FL), (RR), (RL) to apply braking force thereto, respectively. The wheel (FR) designates a wheel at the fore right side as viewed from the position of a driver's seat, the wheel (FL) designates a wheel at the fore left side, the wheel (RR) designates a wheel at the rear right side, and the wheel (RL) designates a wheel at the rear left side. According to the present embodiment, a front and rear dual-circuit system has been employed to divide the circuit into a front pressure circuit and a rear pressure circuit.

According to the present embodiment, a front drive system has been employed, so that the front wheels (FR), (FL) are driven, and the rear wheels (RR), (RL) are not driven. The front wheels (FR), (FL) are connected to the electric motor 11 through a transmission 12. The electric motor 11 is controlled by an electronic control unit 10 which includes a microcomputer 10a for controlling the electric motor 11, which serves as a motor control unit, and a microcomputer 10b for controlling the hydraulic braking pressure, which serves as a hydraulic control unit. The basic structure of each microcomputer is similar to the one disclosed in the prior publication such as Japanese Patent Laid-open Publication No. 7-336806, so that further explanation is omitted. The electric motor 11 used in the present embodiment is an induction motor having a rotor with permanent magnets for providing magnetic poles, and a stator with three-phase wires to which A.C. power is fed to generate a magnetic field for rotating the rotor. Therefore, a drive circuit (not shown) controlled by the microcomputer is provided with a plurality of inverters (not shown). When the rotor of the electric motor 11 is rotating in accordance with the rotation of the wheels (FR), (FL), the electric motor 11 can be braked by generating a magnetic field for preventing the rotor from rotating. The electric power generated in the stator is recovered to charge a battery 13 thereby to brake the wheels, i.e., to perform the regenerative braking operation.

Referring to FIG. 1, the master cylinder 2 has a chamber which is connected to a low-pressure reservoir 4 for storing brake fluid therein. In a main passage 8 which communicates the pressure chamber of the master cylinder 2 with the front wheel brake cylinders 51, 52, a pressure limit changeover device 20 is disposed to add the hydraulic braking operation to the regenerative braking operation, and change the former for the latter. In a main passage 9 which communicates the other one of the pressure chambers of the master cylinder 2 with the rear wheel brake cylinders 53, 54, is disposed a pressure limit changeover device 30 which is slightly different from the pressure limit changeover device 20, as described later. The regulator 3 is connected to an auxiliary power source 40, and both of them are connected to the low-pressure reservoir 4 to which the master cylinder 2 is connected. The auxiliary power source 40 includes a hydraulic pump 41 and an accumulator 44. The hydraulic pump 41 is driven by an electric motor 42 to pressurize the brake fluid in the reservoir 4 and discharge it into the accumulator 44 through a check valve 43. The electric motor 42 is activated when the pressure in the accumulator 44 is lower than a predetermined lower limit, and stopped when the pressure in the accumulator 44 exceeds a predetermined upper limit. Accordingly, the power pressure is supplied from the accumulator 44 into the regulator 3, which regulates the power pressure in response to a pilot pressure of the master cylinder pressure output from the master cylinder 2 to generate a regulated pressure in proportion to the master cylinder pressure, so as to be substantially the same pressure as the master cylinder pressure, like a known regulator. A part of the regulated pressure is provided for assisting or boosting the operation of the master cylinder 2.

In the pressure limit changeover device 20, a first relief valve 21, a solenoid valve 22, a proportioning valve 23 and a second relief valve 26 are arranged in parallel with each other. Furthermore, a solenoid valve 27 is disposed in series with the second relief valve 26. The first relief valve 21 is adapted to operate in such a manner that it is held to close the main passage 8 until the hydraulic pressure generated by the master cylinder 2, i.e., master cylinder pressure, reaches a predetermined pressure (Pc), and actuated to open the main passage 8 when the master cylinder pressure exceeds the predetermined pressure (Pc). The second relief valve 26 is adapted to operate in such a manner that it is held to close the main passage 8 until the master cylinder pressure reaches a predetermined pressure (Pb) which is lower than the predetermined pressure (Pc), and actuated to open the main passage 8 when the master cylinder pressure exceeds the predetermined pressure (Pb).

The solenoid valve 22 is controlled by the electronic control unit 10 to be opened or closed in response to a maximum regenerative braking force. Also, the solenoid valve 27 is controlled by the electronic control unit 10 to be opened or closed in response to the maximum regenerative braking force, more particularly in response to a maximum vehicle speed or a maximum regenerative braking torque.

The proportioning valve 23 has such a characteristic that the master cylinder pressure is increased in response to depression of the brake pedal 5 to supply it to the wheel brake cylinders 51, 52. The proportioning valve 23 has substantially the same structure as that of a conventional proportioning valve for use in a front-rear braking force distribution control, but has a break point in its input-output characteristic to be set at a lower pressure than the conventional proportioning valve, which will be described later in detail. A pair of pressure sensors 24, 25 are connected to the upstream and downstream of the first relief valve 21 and the solenoid valve 22, respectively.

The pressure limit changeover device 30 provided for the rear pressure circuit includes a relief valve 31, a solenoid valve 32 and a proportioning valve 33 which are disposed in parallel with one another. It does not include those corresponding to the second relief valve 26 and the solenoid valve 27, but may include them. The relief valve 31 operates in such a manner that it is held to close the main passage 9 until the master cylinder pressure reaches a predetermined pressure (Pc), and actuated to open the main passage 9 when the master cylinder pressure exceeds the predetermined pressure (Pc). The solenoid valve 32 is controlled to be opened or closed in response to the regenerative braking torque in substantially the same manner as the solenoid valve 22, and the proportioning valve 33 functions in substantially the same manner as the proportioning valve 23.

Figure 5:
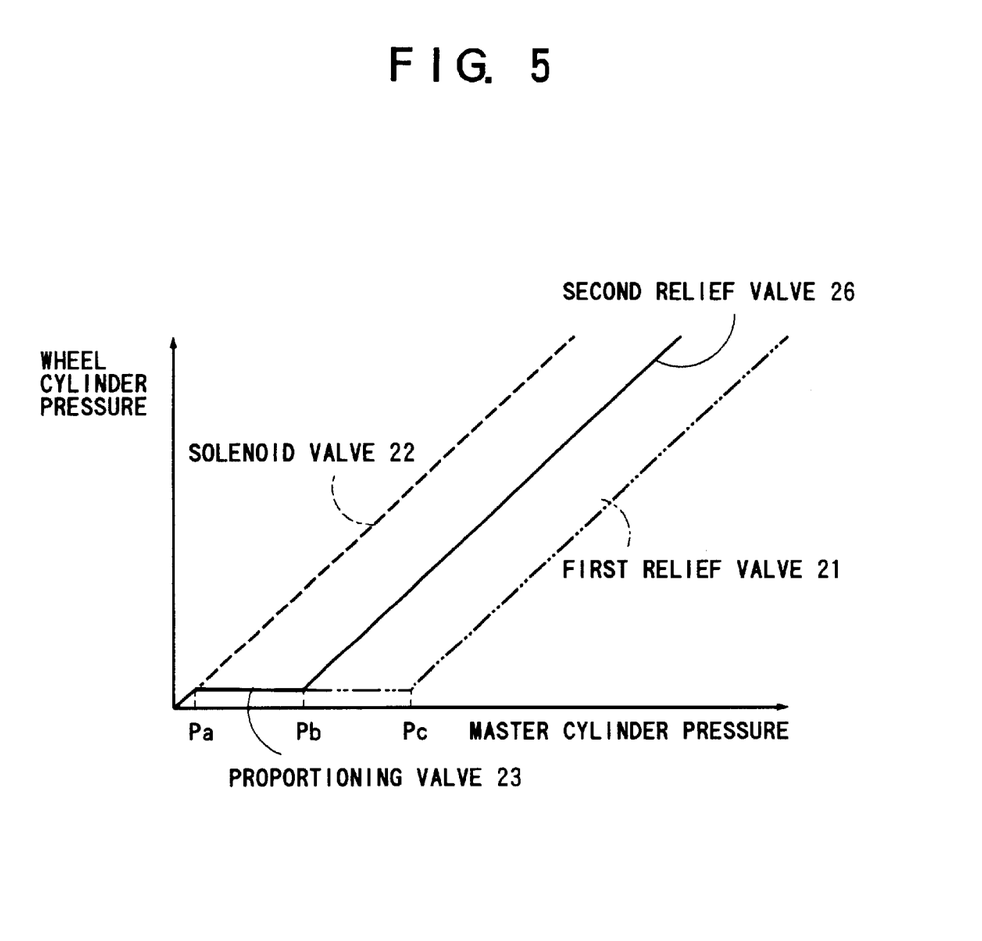
FIG. 5 is a diagram showing a relationship between a master cylinder pressure and a wheel cylinder pressure with respect to first and second relief valves, proportioning valve and solenoid valve in a pressure limit changeover device according to the above embodiment of the present invention.

The first relief valve 21, solenoid valve 22 and proportioning valve 23 in the pressure limit changeover device 20 have such characteristics as shown in FIG. 5. The proportioning valve 23 has such a characteristic that the master cylinder pressure is increased in response to depression of the brake pedal 5 when the braking operation started, so that the hydraulic pressure in the wheel cylinder, i.e., wheel cylinder pressure, is increased in proportion to the increase of the master cylinder pressure. When the wheel cylinder pressure reaches a predetermined pressure (Pa), the wheel cylinder pressure is held to be substantially constant, and thereafter it will be increased by a small amount in response to the increase of the stroke of the brake pedal 5. The predetermined pressure (Pa) is set as low as a value which enables the brake fluid to be fulfilled in the wheel brake cylinders so as to cause a brake pad (not shown) to abut on a rotor (not shown). Thus, the proportioning valve 23 has various functions such as a function for fulfilling the brake fluid in the brake system at the start of the braking operation, a function for blocking the pressure until the relief valve 21 operates, and a function for returning the brake fluid from the wheel brake cylinders 51 and etc, to the master cylinder 2.

The first relief valve 21 operates in such a manner that it is closed until the master cylinder pressure reaches a predetermined pressure (Pc), as shown by a two-dot chain line in FIG. 5 and opened when the master cylinder pressure exceeds the predetermined pressure (Pc), and thereafter the wheel cylinder pressure is increased in proportion to the increase of the master cylinder pressure. The second relief valve 26 operates in such a manner that it is closed until the master cylinder pressure reaches a predetermined pressure (Pb), which is lower than the predetermined pressure (PC), as shown by a solid line in FIG. 5 and opened when the master cylinder pressure exceeds the predetermined pressure (Pb), and thereafter the wheel cylinder pressure is increased in proportion to the increase of the master cylinder pressure. The solenoid valve 27 is provided for controlling the operation of the second relief valve 26, while the solenoid valve 22 has such a characteristic that the wheel cylinder pressure corresponds to the master cylinder pressure when the solenoid valve 22 is placed in its open position, as indicated by a broken line in FIG. 5. In other words, a zone in FIG. 5 surrounded by the broken line indicating the characteristic of the solenoid valve 22, and solid lines indicating the characteristics of the first relief valve 21 or the second relief valve 26, and the proportioning valve 23, is a pressure decreasing zone, where the regenerative braking operation is to be performed in lieu of the hydraulic braking operation.

As shown in FIG. 1, the brake pedal 5 is provided with a brake switch 6 which is turned on when the brake pedal 5 is depressed, and which is connected to the electronic control unit 10, to which the pressure sensors 24, 25 are connected as well. A shift position of the transmission 12 is detected to feed its output signal into the electronic control unit 10. Furthermore, wheel speed sensors 91–94 are provided for the wheels (FR), (FL), (RR), (RL), respectively, and connected to the electronic control unit 10 for feeding thereinto pulse signals proportional to the rotational speeds of the wheels, or the wheel speeds, respectively.

Furthermore, a sub-cylinder 70 is disposed in the main passage 8 between the pressure limit changeover device 20 and the front wheel brake cylinders 51, 52, and connected to an auxiliary passage 9a which is separated from the main passage 9. The sub-cylinder 70 includes a cylindrical housing 71 with an inner bore defined therein, and a piston 72 which is slidably received in the inner bore of the housing 71 to define therein a first pressure chamber 74 and a second pressure chamber 75 on the opposite sides of the piston 72. A spring 73 is disposed in the second pressure chamber 75 to urge the piston 72 to the left in FIG. 1 so as to expand the volume of the second pressure chamber 75 to its maximum volume, so that the volume of the first pressure chamber 74 is minimum. The solenoid valve 61 is disposed on the auxiliary passage 9a which is connected to the first pressure chamber 74. In parallel with the solenoid valve 61, a check valve 62 is disposed. The solenoid valve 61 is of a normally closed two-port two-position electromagnetic valve, which is closed when it is in its inoperative condition, and opened to communicate the first pressure chamber 74 with the regulator 3 through the auxiliary passage 9a when it is in its operative condition. The check valve 62 is provided for allowing the brake fluid to flow from the sub-cylinder 70 to the regulator 3 and blocking the reverse flow.

According to the sub-cylinder 70, therefore, when the solenoid valve 61 is opened, the regulated pressure which is substantially equal to the master cylinder pressure is supplied to the first pressure chamber 74, and the wheel cylinder pressure is supplied to the second pressure chamber 75, so that the regulated pressure output from the regulator 3 and the wheel cylinder pressure in the wheel brake cylinder are fluidly separated. When the regulated pressure and the wheel cylinder pressure are not supplied to the first and second pressure chambers 74, 75, respectively, the piston 72 is placed at a position where the volume of the first pressure chamber 74 is minimum as shown in FIG. 1. When the regulated pressure is supplied from the regulator 3 to the first pressure chamber 74 through the solenoid valve 61 in its open position, the piston 72 is pushed in such a direction as to compress the second pressure chamber 75 against the biasing force of the spring 73, so that the pressurized brake fluid is discharged from the second pressure chamber 75 through the main passage 8 into the wheel brake cylinders 51, 52 to increase the pressure therein. In this case, the brake fluid will not be excessively supplied into the wheel brake cylinders 51, 52, because the amount of the brake fluid supplied into the wheel brake cylinders 51, 52 is limited to the maximum volume of the second pressure chamber 75. In the present invention, however, the regulated pressure may be supplied directly into the wheel brake cylinders 51, 52 when the solenoid valve 61 is opened, so that the sub-cylinder 70 may be omitted.

As shown by one-dot chain line in FIG. 1, a modulator (MD) having a plurality of solenoid valves may be disposed between the sub-cylinder 70 and the wheel brake cylinders 51, 52, and between the pressure limit changeover device 30 and the wheel brake cylinders 53, 54, to be controlled by the electronic control unit 10. According to the modulator (MD), not only an anti-skid control but also a traction control, front-rear braking force distribution control, steering control by braking and the like can be performed.

Figure 3:
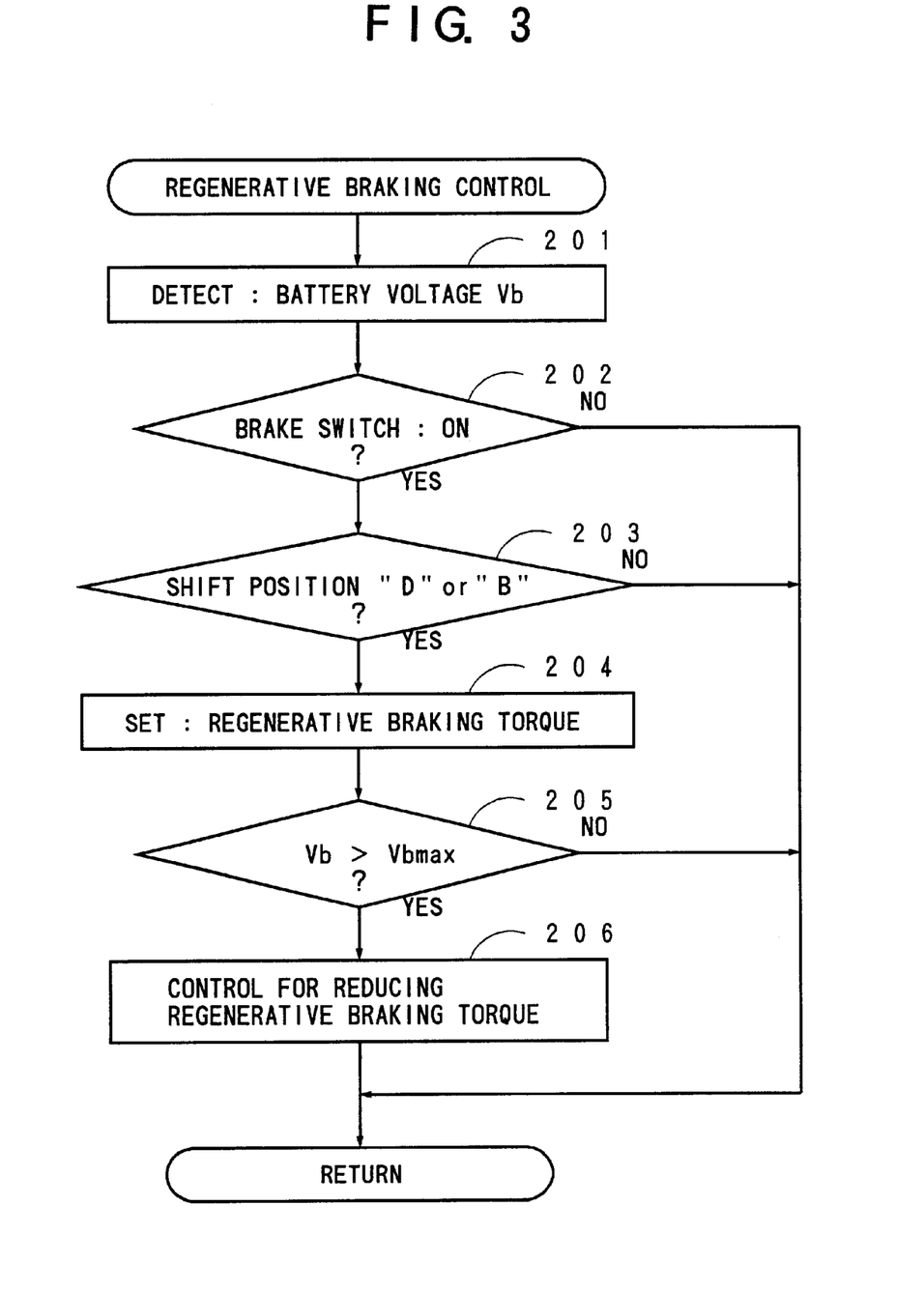
FIG. 3 is a flowchart showing a regenerative braking control operation according to the above embodiment of the present invention.
Figure 4:
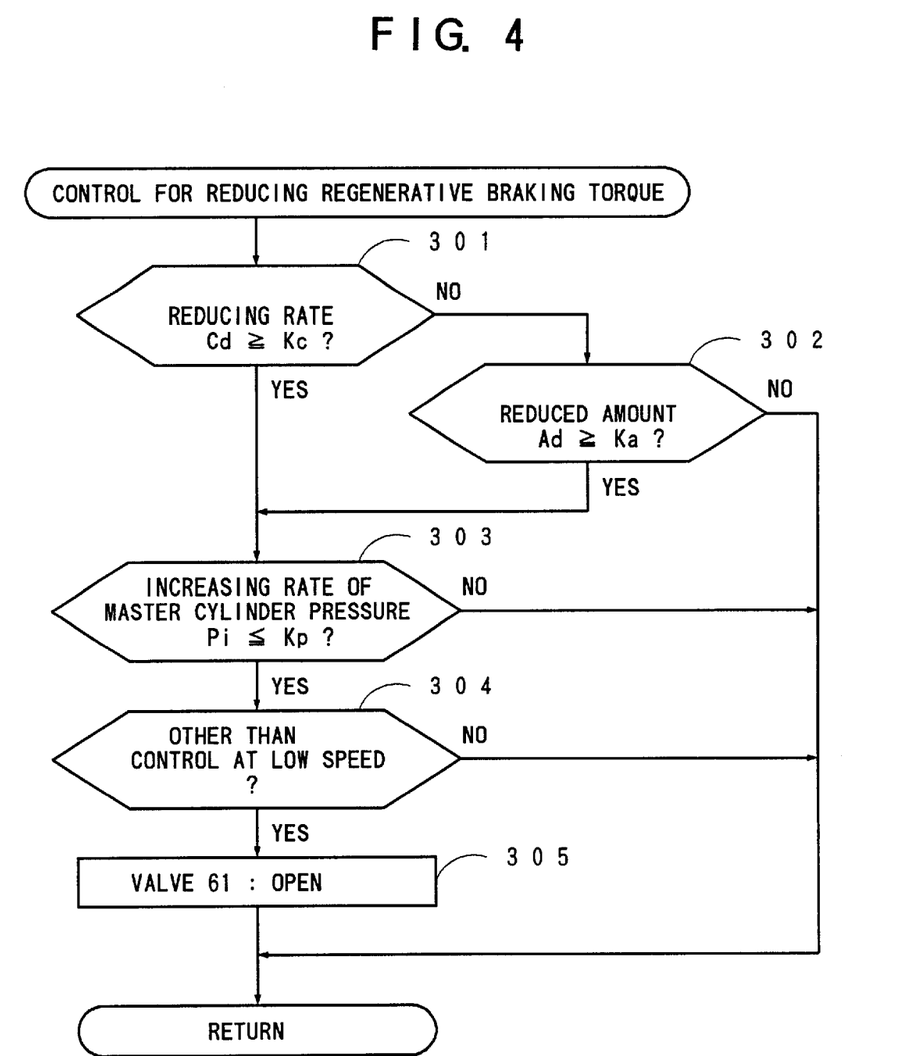
FIG. 4 is a flowchart showing a control for reducing the regenerative braking torque according to the above embodiment of the present invention.

According to the brake control system as structured in FIG. 1, the hydraulic pump 41 is driven by the electric motor 42 to accumulate the power pressure in the accumulator 44 as described before. In the case where the solenoid valves are placed in the positions as shown in FIG. 1, when the brake pedal 5 is depressed, the master cylinder pressure is output from the master cylinder 2, and the regulated pressure is output from the regulator 3. Then, the brake control operation is initiated by the electronic control unit 10, so that the program corresponding to flowcharts as shown in FIGS. 2–4 is executed while the vehicle is moving.

Figure 2:
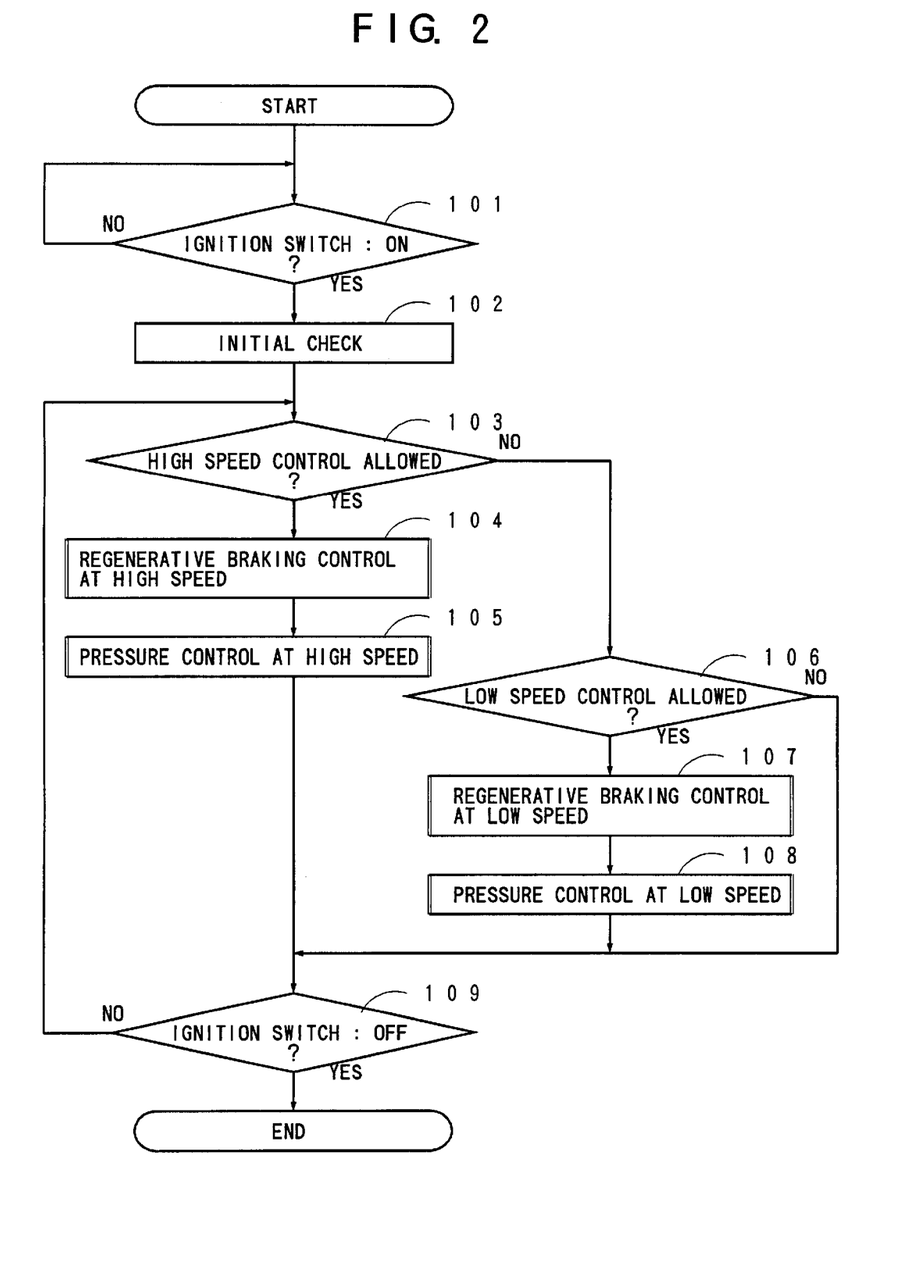
FIG. 2 is a flowchart showing a brake control operation according to the above embodiment of the present invention.

Referring to FIG. 2, when an ignition switch (not shown) is turned on at Step 101, the program proceeds to Step 102 where an initial check is executed. That is, the conditions of the electric motor 11, transmission 12 and battery 13 are detected to determine whether the condition for starting the regenerative braking operation has been fulfilled or not. For example, when the vehicle travels at a very low speed, or when the pressure in the battery 13 tends to increase, or when the battery 13 has been fully charged, or when a malfunction occurs, or when the transmission 12 is shifted in its neutral position, it is determined that the condition for starting the regenerative braking operation has not been fulfilled, so that a certain warning will be made.

If the starting condition of the regenerative braking operation has been fulfilled, the program proceeds to Step 103 where a condition for performing a hydraulic pressure control to be made when the vehicle travels at a relatively high speed has been fulfilled, or not. If the condition has been fulfilled, the program proceeds to Steps 104, 105 where the regenerative braking control and hydraulic pressure control to be made when the vehicle travels at the high speed will be executed according to a sub-routine (not shown). Otherwise, the program proceeds to Step 106. At Step 106, a condition for performing a hydraulic pressure control to be made when the vehicle travels at a relatively low speed has been fulfilled, or not. If the condition has been fulfilled, the program proceeds to Steps 107, 108 where the regenerative braking control and hydraulic pressure control to be made when the vehicle travels at the low speed will be executed according to a sub-routine (not shown). If the condition has not been fulfilled, the program proceeds to Step 109, where it is determined whether the ignition switch (not shown) has been turned on or off. Accordingly, Steps 103–108 are repeatedly executed, until it is determined that the ignition switch has been turned off.

The regenerative braking control to be made at Steps 104, 107 will be explained hereinafter, with reference to FIG. 3. At the outset, the voltage (Vb) of the battery is detected at Step 201. Then, it is determined whether the brake switch 6 has been turned on or off. If the brake switch 6 has been turned on, the program proceeds to Step 203 where a shift position of the transmission 12 is determined. If the shift position is placed in a driving range (D) or a motor braking range (B), the program proceeds to Step 204. The motor braking range (B) is a range specifically provided for the electrically operated vehicle, wherein a braking condition similar to an engine brake is obtained without maneuvering the brake pedal 5. Then, the regenerative braking torque is set at Step 204, in accordance with the control mode when the vehicle travels at a high speed, or the control mode when the vehicle travels at a low speed. Then, it is determined at Step 205 whether the voltage (Vb) of the battery has exceeded a predetermined upper limit (Vbmax). If the result is affirmative, the program proceeds to Step 206 where a control for reducing the regenerative braking torque is performed, as will be described later in detail. If the result determined at Steps 202, 203, 205 is negative, the program returns to the main routine.

FIG. 4 shows the routine of the control for reducing the regenerative braking torque which is executed at Step 206. At the outset, a reducing rate, or reducing ratio, (Cd) is compared with a predetermined rate, or ratio (Kc), at Step 301. If it is determined that the reducing rate (Cd) is equal to or greater than the predetermined rate (Kc), the program proceeds to Step 303. If it is determined that the reducing rate (Cd) is smaller than the predetermined rate (Kc), the program proceeds to Step 302 where a reduced amount (Ad) of the regenerative braking torque is compared with a predetermined amount (Ka). If it is determined that the reduced amount (Ad) is equal to or greater than the predetermined value (Ka), the program proceeds to Step 303. If it is determined that the the reduced amount (Ad) is smaller than the predetermined value (Ka), the program returns to the routine as shown in FIG. 3. At Step 303, a pressure-increasing rate (Pi) of the master cylinder pressure is compared with a predetermined increasing rate (Kp). If it is determined that the pressure-increasing rate (Pi) is equal to or smaller than the predetermined increasing rate (Kp), the program proceeds to Step 304. If it is determined that the pressure-increasing rate (Pi) is greater than the predetermined increasing rate (Kp), the program returns to the routine as shown in FIG. 3. At Step 304, it is determined whether the control is being made when the vehicle travels at a relatively low speed. If the result is affirmative, the program returns to the routine as shown in FIG. 3. If it is determined that the control is being made when the vehicle travels at a speed other than the low speed, the program proceeds to Step 305 where the solenoid valve 61 is placed in its open position, so that the regulated pressure is supplied to the sub-cylinder 70 from the auxiliary pressure source 40, thereby to compensate the reduced amount of the regenerative braking torque immediately.

Figure 6:
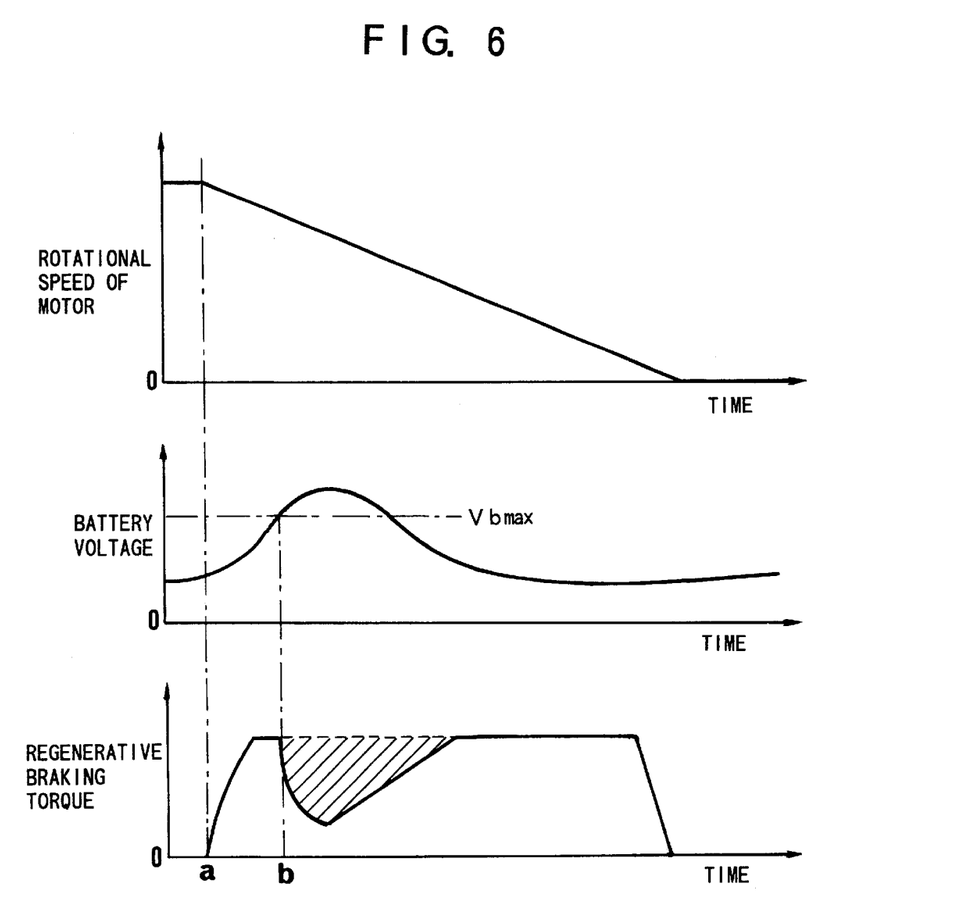
FIG. 6 is a diagram showing the regenerative braking control operation according to the above embodiment of the present invention.

FIG. 6 shows variations of the rotational speed of the motor, voltage of the battery and regenerative braking torque, according to the present embodiment. The brake pedal 5 is depressed at a point "a" in FIG. 6, and the regenerative braking operation is initiated, while the hydraulic braking operation control is in its stand-by condition, i.e., such a condition that the master cylinder pressure and regulated pressure are output in response to depression of the brake pedal 5, but have not yet worked for applying the braking force to the wheel. And, when the control for reducing the regenerative braking torque is initiated at the point "b", the regenerative braking torque will be rapidly reduced. According to the present embodiment, the hydraulic braking control by the regulated pressure through the sub-cylinder 70 is performed to compensate the reduced braking torque. And, immediately after the conditions as listed in the flowchart of FIG. 4 are fulfilled, the regenerative braking torque will be compensated by the hydraulic braking control. That is, the following conditions may be employed as "AND" conditions:

(1) The decreasing rate of the regenerative braking torque is equal to or more than the predetermined rate, or the reduced amount is equal to or greater than the predetermined amount, (2) the pressure-increasing rate of the master cylinder pressure is equal to or smaller than the predetermined increasing rate, (3) the brake switch 6 is on, and (4) the control is not the one to be made when the vehicle travels at a low speed.

Figure 7:
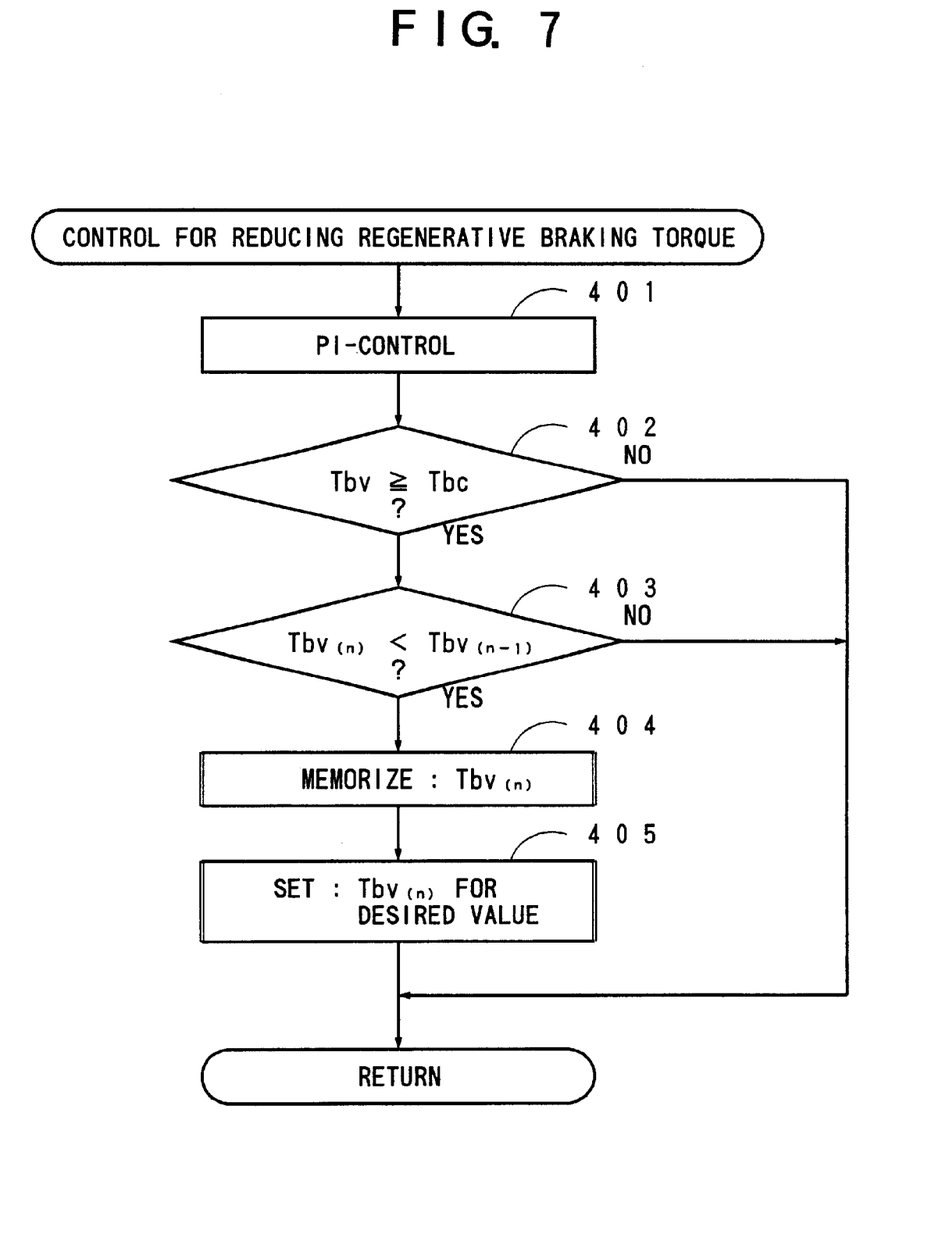
FIG. 7 is a flowchart showing a control for reducing the regenerative braking torque according to another embodiment of the present invention.
Figure 8:
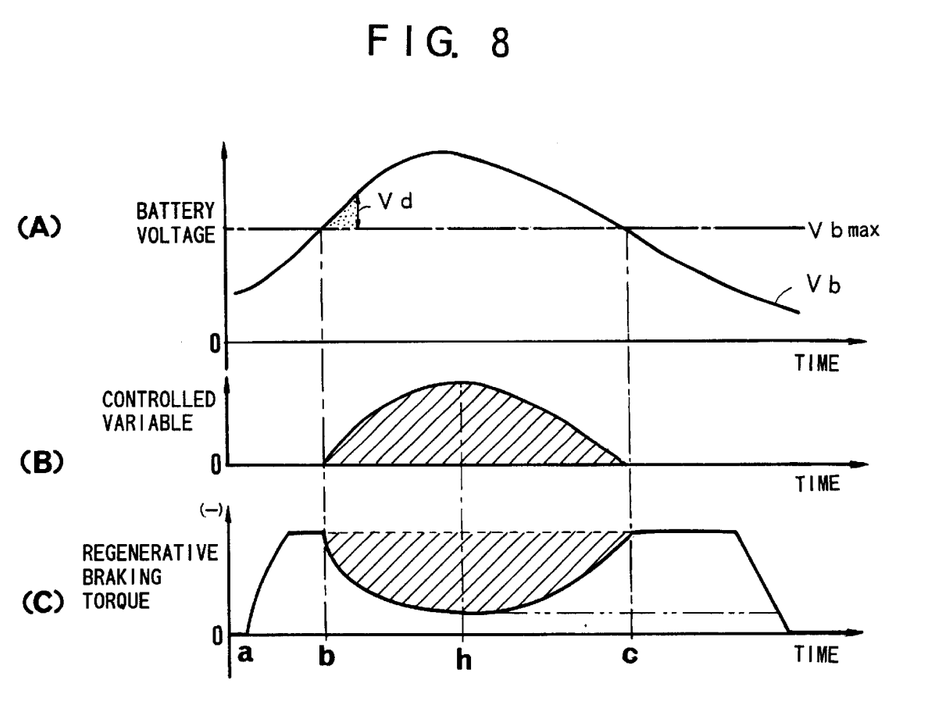
FIG. 8 is a diagram showing the regenerative braking control operation according to another embodiment of the present invention.

Referring to FIGS. 7–9 will be explained another embodiment of the present invention, wherein FIGS. 1–3 and FIG. 5 are incorporated as they are. FIG. 7 shows another embodiment of the routine of the control for reducing the regenerative braking torque to be executed at Step 206 in FIG. 3, wherein a PI-control is performed at Step 401, and a desired value (Tbv) of the regenerative braking torque which is required for the PI-control is compared with a reference value (Tbc) at Step 402. An example of the PI-control performed at Step 401 is illustrated in FIG. 8. On the basis of a P-action, i.e., a proportional action which acts in proportion to a difference (Vd) between the voltage (Vb) of the battery and the upper limit (Vbmax) as shown in FIG. 8(A) illustrating the variation of the voltage of the battery, and an I-action, i.e., an integral action which integrates the difference (Vd) between the voltage (Vb) of the battery and the upper limit (Vbmax), as shown by a dotted area in FIG. 8(A), a controlled variable is obtained as shown by a hatching area in FIG. 8(B). Then, the controlled variable in FIG. 8(B) is subtracted from the regenerative braking torque as shown in FIG. 8(C). Thus, in general, the regenerative braking operation is started at a point "a" in FIG. 8(C), and the control for reducing the regenerative braking torque is initiated at a point "b". Then, the original regenerative braking torque is recovered at a point "c" in FIG. 8 (C).

Referring back to FIG. 7, if it is determined that an absolute value of the desired value (Tbv) is equal to or greater than the reference value (Tbc), the program proceeds to Step 403. If it is determined that the absolute value of the desired value (Tbv) is smaller than the reference value (Tbc), the program returns to the routine in FIG. 3. At Step 403, the desired value (Tbv$_{(n-1)}$) obtained at the previous cycle is compared with the desired value (Tbv$_{(n)}$) obtained at the present cycle. If it is determined that the desired value (Tbv$_{(n)}$) obtained at the present cycle is smaller than the desired value (Tbv$_{(n-1)}$) obtained at the previous cycle, which corresponds to a point "h" in FIG. 8, it means that the controlled variable, i.e., the reduced amount, which is required every predetermined period, has been changed from an increase of the amount to a decrease of the amount. Then, the desired value (Tbv$_{(n)}$) is stored in the memory at Step 404. The program further proceeds to Step 405, where the desired value (Tbv$_{(n)}$) is set for the desired value (Tbv) to the regenerative braking torque in the following regenerative braking operation. That is, the regenerative braking torque is controlled as indicated by a two-dot chain line in FIG. 8(C), thereby to minimize the regenerative braking torque.

Figure 9:
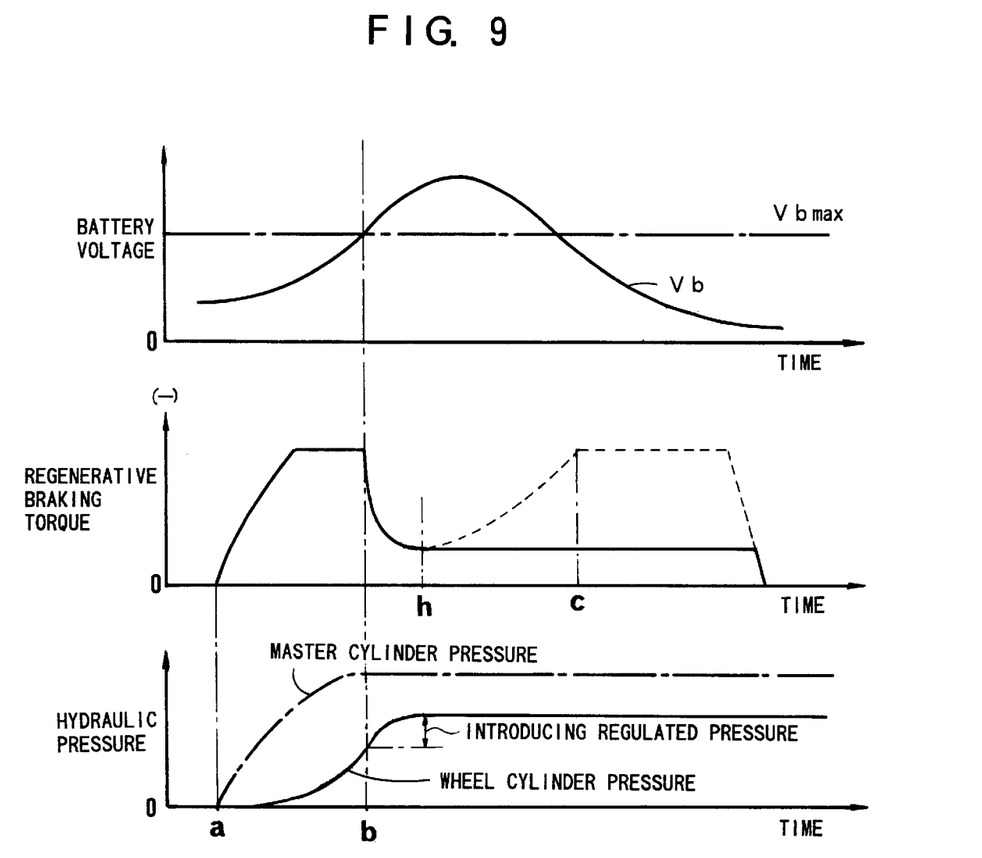
FIG. 9 is a diagram showing variations of voltage of a battery, regenerative braking torque, master cylinder pressure and wheel cylinder pressure according to another embodiment of the present invention.

FIG. 9 shows variations of the voltage of the battery, regenerative braking torque, master cylinder pressure and wheel cylinder pressure according to the present embodiment. The brake pedal 5 is depressed at a point "a" in FIG. 9, and the regenerative braking operation is initiated, while the hydraulic braking operation control is in its stand-by condition, i.e., such a condition that the master cylinder pressure and regulated pressure are output in response to depression of the brake pedal 5, but have not yet worked for applying the braking force to the wheel. And, when the control for reducing the regenerative braking torque is initiated at the point "b", the hydraulic braking control by the regulated pressure through the sub-cylinder 70 is performed to compensate the reduced braking torque. Thereafter, according to the prior brake system as described before, the regenerative braking torque is recovered to provide the original value thereof at a point "c" as shown by a broken line in FIG. 9. According to the present embodiment, however, the regenerative braking torque is maintained to be of the minimum value, i.e., the value at a position "h", as shown by a solid line in FIG. 9. As a result, the braking force is applied to the wheel smoothly by means of the hydraulic braking torque obtained after the regulated pressure was applied, and the regenerative braking torque, so that the brake feeling is improved very much, comparing with the prior system.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A brake control system for controlling a braking force applied to a wheel of an electrically operated vehicle, comprising:

an electric motor operatively connected to said wheel for rotating said wheel;

a battery mounted on said vehicle and electrically connected to said electric motor for driving said electric motor;

motor control means for controlling said electric motor to apply a rotating force to said wheel and apply a regenerative braking torque to said wheel;

a wheel brake cylinder operatively mounted on said wheel for applying a hydraulic braking force to said wheel;

pressure control means for supplying pressurized brake fluid to said wheel brake cylinder in response to operation of a manually operated braking member to apply the hydraulic braking force to said wheel, and controlling the pressure in said wheel brake cylinder;

voltage detection means for detecting voltage of said battery;

reducing means for reducing the regenerative braking torque when the voltage of said battery detected by said detection means exceeds a predetermined upper limit; and holding means for holding said reducing means in a condition for reducing the regenerative braking torque when the amount reduced by said reducing means in a predetermined period is in transition from an increase to a decrease, said pressure control means continuing to apply the hydraulic braking force to said wheel after the transition of the increase to the decrease of the reduced amount until said vehicle stops.

2. The brake control system as claimed in claim 1, wherein said pressure control means comprises;

static pressure generating means for pressurizing the brake fluid stored in a reservoir in response to operation of said manually operated braking member to generate a static hydraulic pressure;

an auxiliary power source for pressurizing the brake fluid stored in said reservoir irrespective of operation of said manually operated braking member to generate a power pressure; and dynamic pressure generating means for regulating the power pressure in response to operation of said manually operated braking member to generate a dynamic hydraulic pressure, and wherein said pressure control means is adapted to supply the dynamic hydraulic pressure to said wheel brake cylinder to apply the hydraulic braking force to said wheel connected to said electric motor, and continue to supply the dynamic hydraulic pressure to said wheel brake cylinder to apply the hydraulic braking force to said wheel after the transition of the increase to the decrease of the amount reduced by said reducing means until said vehicle stops.

3. The brake control system as claimed in claim 1, further comprising compensation means for actuating said pressure control means to supply the pressurized brake fluid to said wheel brake cylinder when the regenerative braking torque reduced by said reducing means exceeds a predetermined level.

4. The brake control system as claimed in claim 3, wherein said compensation means is adapted to actuate said pressure control means to supply the pressurized brake fluid to said wheel brake cylinder, when a rate for reducing the regenerative braking torque by said reducing means exceeds a predetermined rate.

5. The brake control system as claimed in claim 3, wherein said compensation means is adapted to actuate said pressure control means to supply the pressurized brake fluid to said wheel brake cylinder, when an amount of the regenerative braking torque reduced by said reducing means exceeds a predetermined amount.

6. The brake control system as claimed in claim 3, wherein said pressure control means comprises;

static pressure generating means for pressurizing the brake fluid stored in a reservoir in response to operation of said manually operated braking member to generate a static hydraulic pressure;

an auxiliary power source for pressurizing the brake fluid stored in said reservoir irrespective of operation of said manually operated braking member to generate a power pressure; and dynamic pressure generating means for regulating the power pressure in response to operation of said manually operated braking member to generate a dynamic hydraulic pressure, and wherein said pressure control means is adapted to supply the dynamic hydraulic pressure to said wheel brake cylinder to apply the hydraulic braking force to said wheel connected to said electric motor.

7. The brake control system as claimed in claim 6, wherein said compensation means is adapted to actuate said pressure control means to supply the pressurized brake fluid to said wheel brake cylinder when a pressure-increasing rate of the static hydraulic pressure discharged from said static pressure generating means is smaller than a predetermined increasing rate.

\* \* \* \* \*